(12) United States Patent  
Arbuckle et al.

(10) Patent No.: US 10,594,510 B1  
(45) Date of Patent: Mar. 17, 2020

(54) MARINE PROPULSION CONTROL SYSTEM AND METHOD WITH AUTOMATIC CAN ADDRESSING

(71) Applicant: Brunswick Corporation, Mettawa, IL (US)

(72) Inventors: Jason S. Arbuckle, Horicon, WI (US); Kent A. Prochazka, Fort Collins, CO (US); Thomas S. Kirchhoff, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 23 days.

(21) Appl. No.: 16/162,038

(22) Filed: Oct. 16, 2018

(51) Int. Cl.
*H04L 12/40* (2006.01)
*H04L 12/24* (2006.01)
*H04L 29/08* (2006.01)

(52) U.S. Cl.
CPC ........ *H04L 12/40169* (2013.01); *H04L 41/12* (2013.01); *H04L 67/12* (2013.01); *H04L 2012/40234* (2013.01); *H04L 2012/40286* (2013.01)

(58) Field of Classification Search
CPC ... H04L 12/40169; H04L 41/12; H04L 67/12; H04L 2012/40234; H04L 2012/40286
See application file for complete search history.

(56) References Cited

U.S. PATENT DOCUMENTS

| | | | |
|---|---|---|---|
| 6,273,771 B1 | 8/2001 | Buckley et al. | |
| 6,382,122 B1 | 5/2002 | Gaynor et al. | |
| 7,941,253 B1 | 5/2011 | Brant | |
| 9,857,794 B1* | 1/2018 | Jarrell | G05D 1/0206 |
| 2004/0057450 A1* | 3/2004 | Okuyama | H04L 12/403 370/447 |
| 2017/0253314 A1* | 9/2017 | Ward | B63H 25/04 |

* cited by examiner

*Primary Examiner* — Duc C Ho  
(74) *Attorney, Agent, or Firm* — Andrus Intellectual Property Law, LLP

(57) ABSTRACT

A controller associated with a propulsion device in a marine propulsion system stores computer-executable instructions to perform a method of automatically configuring at least one other controller associated with the propulsion device. The method includes storing a controller CAN address that identifies a propulsion device position of the propulsion device in the marine propulsion system, and then receiving an identification CAN message communicating an initial CAN address from the other controller via a dedicated CAN bus, wherein the initial CAN address contains initial propulsion device position information. The initial CAN address is compared to the controller CAN address to determine whether the initial propulsion device position information correctly identifies the propulsion device position and, if it does not, the controller sends a change CAN message via the dedicated CAN bus to change the initial CAN address of the other controller to a correct CAN address identifying the propulsion device position.

20 Claims, 4 Drawing Sheets

MARINE PROPULSION CONTROL SYSTEM AND METHOD WITH AUTOMATIC CAN ADDRESSING

FIELD

The present disclosure generally relates to a propulsion control system for a marine vessel and, more particularly, to a propulsion control method and system involving controllers communicating on a controller area network (CAN) bus that automatically assigns correct CAN addresses of various controllers communicating on the bus during configuration of the marine propulsion system, or during a retrofit, repair, or recalibration procedure involving the propulsion control system.

BACKGROUND

Marine vessels, particularly those with helms or control stations located away from the marine propulsion devices, require some way to allow the marine vessel operator to be located at a helm or control station and be able to control operation of the marine vessel. This control includes the throttle control, steering control, and the monitoring of various operating parameters relating to the vessel. Marine vessel control systems utilizing "drive-by-wire" throttle and shift control arrangements are well-known, in which electronic signals are transmitted between the control station and the marine propulsion system to affect steering and/or engine speed control.

Various types of control systems have been developed to allow an operator to control a marine vessel. Some control systems incorporate numerous components that are connected by individual conductive wires to a central control station. Similarly, gauges are individually connected by conductive wire to various sensors in a typical application. Alternatively, other systems use a common communication bus to which all devices in the system are connected. One type of common communication bus is known as the controller area network (CAN) bus. CAN systems have been used for many years and are well known to those skilled in the art of marine vessel controls. The CAN bus can operate in extremely harsh environments and has extensive error checking mechanisms that ensure that any transmission errors are detected. The basic protocol of the CAN system can be used to accomplish many different control tasks and provide an arbitration scheme that effectively eliminates collisions or interferences between message packets transmitted by the multiple devices connected thereto. Thus, CAN systems are effective in avoiding interference between the signal from one device and a signal from another device. Different CAN system protocols, architectures, and arrangements are known in the relevant field of marine vessel controls, examples of which are shown and described in the following patents, which are each incorporated herein by reference in their entireties.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,382,122 discloses an auto-detect system for a marine vessel in which the various associations and relationships between marine propulsion devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with reference to their location on the marine vessel and to identify certain other components, such as gauges, with reference to both their location at a particular helm station and their association with a particular marine propulsion device.

U.S. Pat. No. 7,941,253 discloses a marine propulsion drive-by-wire control system that controls multiple marine engines, each one or more PCMs, propulsion controllers for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a controller associated with a propulsion device in a marine propulsion system has computer-executable instructions stored thereon executed by a processor to perform a method of automatically configuring at least one other controller associated with the propulsion device. The method includes storing a controller CAN address that identifies a propulsion device position of the propulsion device in the marine propulsion system, and then receiving an identification CAN message communicating an initial CAN address from the other controller via a dedicated CAN bus, wherein the initial CAN address contains initial propulsion device position information. The method further includes comparing the initial CAN address to the controller CAN address to determine whether the initial propulsion device position information correctly identifies the propulsion device position. If the initial CAN address does not correctly identify the propulsion device position, the controller sends a change CAN message via the dedicated CAN bus to change the initial CAN address stored in memory of the other controller to a correct CAN address that identifies the propulsion device position.

In one embodiment, a marine propulsion system comprises at least a first propulsion device at a first propulsion device position on a marine vessel, a first ECM communicatively connected to the first propulsion device to effectuate control thereof, the first ECM having an initial ECM CAN address stored in memory. The system further includes a first HCM having a first HCM CAN address stored in memory, wherein the first HCM CAN address identifies the first propulsion device position, and a first dedicated CAN bus communicatively connecting the first ECM and first HCM so as to communicate CAN messages therebetween. The first HCM is configured to receive an identification CAN message communicating an initial ECM CAN address from the first ECM via the first dedicated CAN bus and compare the initial ECM CAN address to the first HCM CAN address to determine whether the initial ECM CAN address correctly identifies the first propulsion device position. An incorrect ECM CAN address is identified based on the comparison, wherein the initial ECM CAN address does not correctly identify the first propulsion device position, and then the HCM sends a change address CAN message via the first dedicated CAN bus to change the initial ECM CAN address to a correct first ECM CAN address that identifies the first propulsion device position.

One embodiment of the method of configuring a marine propulsion system includes providing at least a first propulsion device at a first propulsion device position on a marine vessel, providing a first ECM having an initial CAN address stored in memory, and providing a first HCM having a first HCM CAN address stored in memory, wherein the first HCM CAN address identifies the first propulsion device position. A first dedicated CAN bus is also provided communicatively connecting the first ECM and the first HCM so as to communicate CAN messages therebetween. The method further includes, at the first HCM, receiving an identification CAN message communicating an initial ECM CAN address from the first ECM via the first dedicated CAN bus, and comparing the initial ECM CAN address to the first HCM CAN address to determine whether the initial ECM CAN address correctly identifies the first propulsion device position. An incorrect ECM CAN address is identified based on the comparison, wherein the initial ECM CAN address does not correctly identify the first propulsion device position. Upon identifying the incorrect ECM CAN address, a change address CAN message is sent via the first dedicated CAN bus from the first HCM to change the initial ECM CAN address stored in memory of the first ECM to a correct first ECM CAN address that identifies the first propulsion device position.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
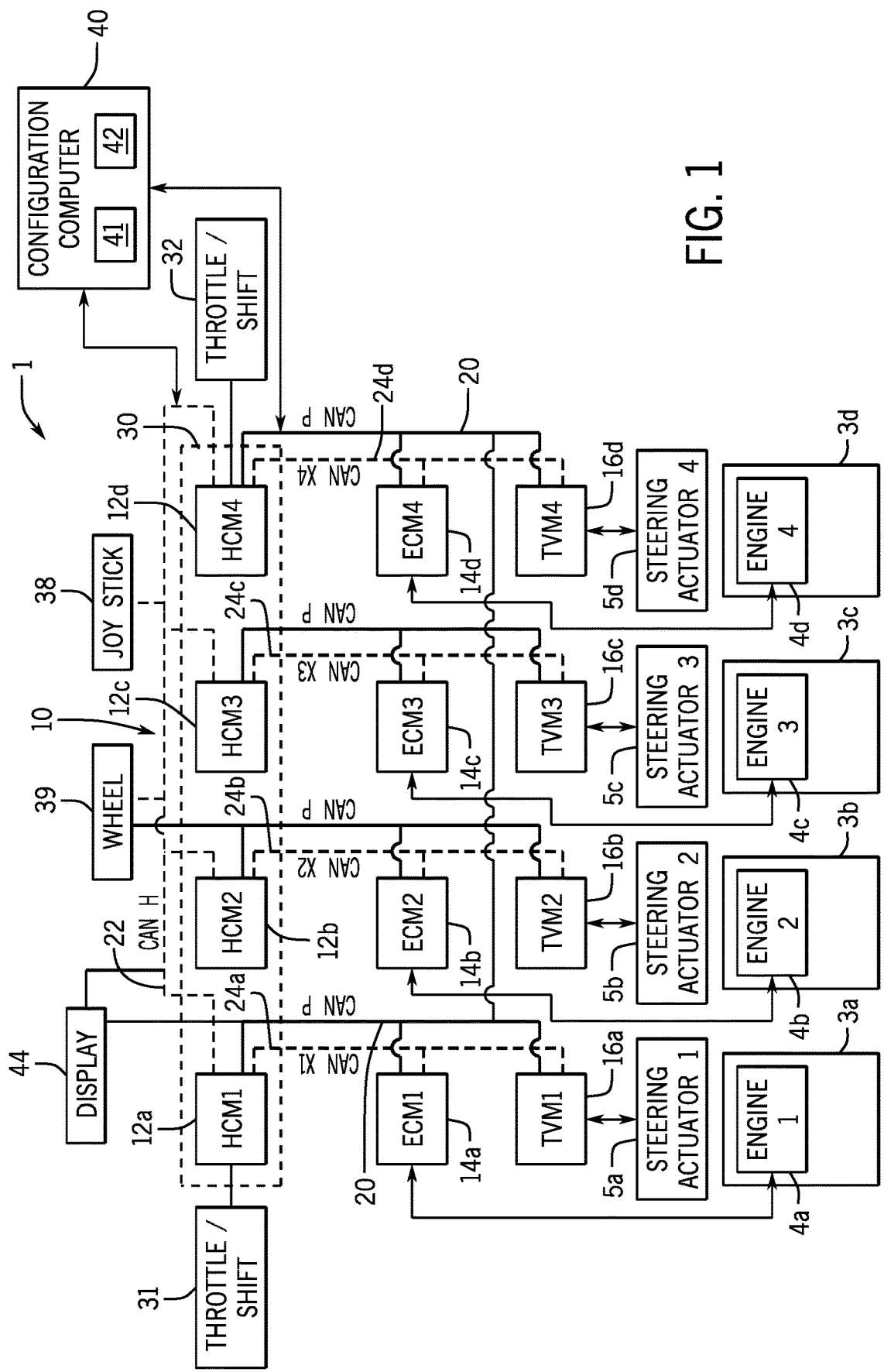
FIG. 1 is a schematic representation of an exemplary marine propulsion system including an exemplary set of propulsion devices and a corresponding propulsion control system.

Many marine vessels have propulsion systems comprising several marine propulsion devices, such as outboard motors, stern drive systems, inboard propulsion systems, or jet drives. In addition, marine vessels have at least one helm station, or control station, where a marine vessel operator can be located for the purpose of controlling operation of the marine vessel, including providing propulsion and steering control. Many marine vessels have two or more such helm stations. Each helm is provided with multiple systems and devices to allow the marine vessel operator to control the speed of the marine vessel, steer the marine vessel, and to monitor a plurality of gauges and sensor devices describing the status of various aspects of the marine vessel, including location status, engine status, information about the environment of the marine vessel, etc. All such devices comprise part of the propulsion control system 10.

Often, the various devices on a propulsion control system 10 communicate with one another via a common serial communication bus, such as CAN bus, where all of the marine propulsion devices, controllers, and associated sensors and gauges, are connected in signal communication with one or more CAN buses. Various CAN protocols are known in the art. One exemplary CAN architecture and protocol often employed in marine applications is the CAN Kingdom network provided by Kvaser Consultants AB of Sweden.

Each of the devices communicating as part of the CAN system must have a unique identification, typically referred to as a CAN address. Providing a unique CAN address for each of the devices communicating on the CAN bus allows determination of the identity of a particular device on the CAN bus, which allows for identification of a message source and can allow targeted communication between devices. Moreover, each controller, sensor, gauge, etc. must be appropriately assigned to its associated marine propulsion device. This is especially important where multiple propulsion devices, and thus multiple redundant controllers, are present on the network because it allows discrimination between the propulsion devices and associated controllers. Thereby, each propulsion device can be controlled separately and messages relating to each propulsion device, such as sensed values and error messages, can be correctly interpreted. Similarly, unique CAN addressing allows determination of the number of devices communicating on the CAN bus and also facilitates arbitration between conflicting messages.

In the disclosed system and method the CAN address for each device are configured to identify the device's function, and for all devices relating to a particular propulsion device—e.g., the engine controllers, helm controllers, steering controllers, sensors, etc.—the CAN address identifies the propulsion device to which it is attached. In a multi-propulsion-device system, the propulsion devices are typically identified based on their location on the marine vessel, such as the position at which they are mounted at the stern or on the transom of the marine vessel. For example, in a five propulsion device system, the propulsion devices may be identified as port outer, port inner, center, starboard inner, and starboard outer.

Because of the variability and customization of propulsion system configurations, CAN system setup and configuration has long been problematic. Relevant controllers, sensors, gauges, etc. are typically provided with a default CAN address, which needs to be changed during the configuration process. For example, for a propulsion system having multiple propulsion devices, each propulsion device typically has several controllers associated therewith, including an engine controller (ECM), a helm controller (HCM), and a thrust vector module (TVM). Each type of controller is typically sold and supplied with a default configuration having a default CAN address, and each controller then needs to be configured in the field to adjust the CAN address to associate each controller with a respective propulsion device and to configure the controller to recognize and operate on the one or more CAN buses in a particular propulsion system configuration and to communicate with all other devices communicating on those CAN busses. The default CAN address refers to a manufacturer or seller-set CAN address, which specifies default propulsion device position information. The default propulsion device position information may be, for example, a default specified position (e.g. the value typically designated for and associated with the port outer position). Alternatively, the default propulsion device position information may be a default value that is unassociated with any propulsion device position. Though the default CAN address typically includes information identifying the type, or function, of the device— e.g., engine controller, helm controller, GPS system, steering wheel position sensor—the default CAN address will not uniquely identify that device where on more than one of the same type of device is incorporated in a propulsion system because each of those modules has the same default CAN address.

Thus, the configuration process of multi-propulsion-device control systems is complicated by the fact that, initially, the configuration control software cannot single out a specific device between those having identical default CAN addresses in order to assign each device a unique CAN address. Moreover, if CAN addresses are not correctly assigned, debugging the control system to identify the problem is often problematic because the configuration control software cannot connect to or identify a specific module to determine if there are faults or other issues, and thus cannot identify the source of the problem. This makes a failed configuration procedure very difficult to correct in the field.

FIG. 1 depicts an exemplary propulsion system 1 that includes four propulsion devices 3a-3d. Each of the four propulsion devices 3a-3d has a respective position on the marine vessel, which includes a port outer propulsion device 3a, a port inner propulsion device 3b, a starboard inner propulsion device 3c, and a starboard outer propulsion device 3d. The propulsion devices 3a-3d may be any type of propulsion device appropriate for use in propelling a marine vessel, such as an outboard motor, a stern drive, an inboard motor, a jet drive, etc.

The propulsion control system 10 for the propulsion system 1 includes a set of controllers for each propulsion device 3a-3d. A helm controller (HCM) is provided for determining and conveying instructions relating to the helm devices and/or determining steering instructions based thereon. For example, the HCM 12 may be configured to determine steering instructions based on inputs from the joystick 38 and/or steering wheel 39 at the helm, and throttle and shift instructions received at the corresponding throttle/shift levers 31, 32. In certain embodiments, an HCM 12a-12d is provided for each propulsion device 3a-3d. In other embodiments, a single HCM may be provided that is configured to determine control instructions for more than one propulsion device, such as one HCM configured to control all propulsion devices 3a-3d on the marine vessel. The exemplary control system 10 in FIG. 1 further includes an engine controller (ECM) 14a-14d for controlling each engine 4a-4a of each respective propulsion device 3a-3d, such as to control engine speed and/or other engine parameters in order to effectuate propulsion input, such as by the throttle/shift levers 31, 32 and/or the joystick 38. In certain embodiments, a thrust vector module (TVM) 16a-16d may also be included for each propulsion device. Each TVM controls steering of a propulsion device 3a-3d, such as by controlling a steering actuator 5a-5d to effectuate a steering position of each propulsion device 3a-3d. In certain embodiments, the TVMs 16a-16d may further be configured to control trim actuators and/or other trim devices (such as trim tabs) associated with the propulsion devices 3a-3d and/or the marine vessel. In other embodiments, the control system 10 may further include one or more dedicated trim actuators, such as a trim controller for each trimmable device (e.g. each propulsion device 3a-3d and each trim tab) within the propulsion system 1. In certain embodiments, each TVM 16a-16d may further be configured to send control signals to a transmission within the propulsion device 3a-3d (e.g., a clutch (such as a dog clutch) or a continuous variable transmission) in order to control the direction of thrust by the propulsion device 3a-3d in response in response to input via the throttle/shift levers 31-32 and/or the joystick 38. In other embodiments, the ECM may control the transmission, including shifting and/or slip functionality.

Figure 4:
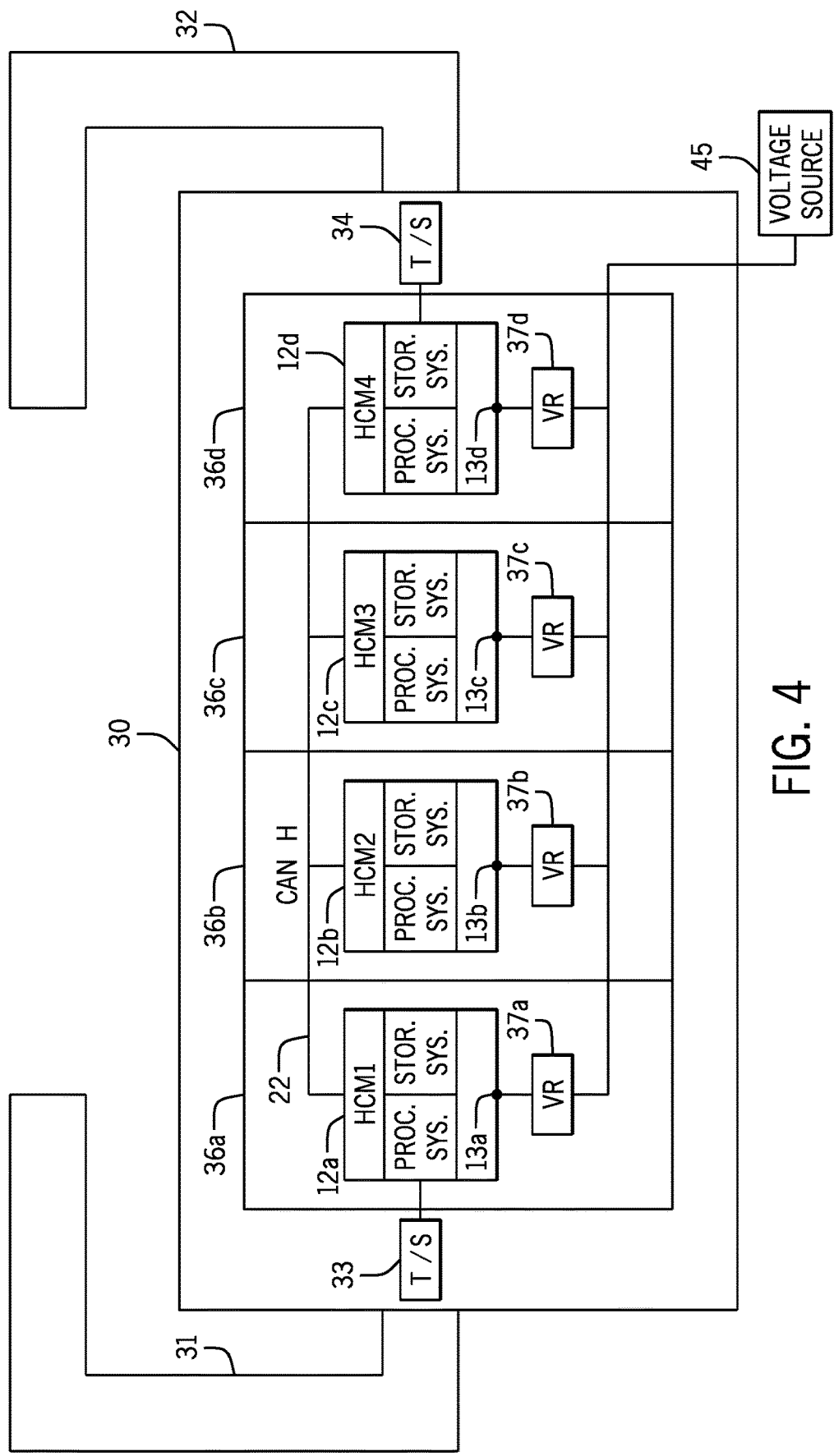
FIG. 4 is a schematic diagram of an electronic remote control having incorporated helm controllers in accordance with one embodiment of the disclosed propulsion control system.

The various controllers within the control system 10 are connected via one or more serial communication buses, such as CAN buses managed according to a CAN protocol. In the depicted environment, the CAN system is organized to include a helm CAN bus (CAN H) 22 connecting the HCMs 12a-12d. The helm CAN bus 22 communicates messages between the HCMs 12a-12d and messages from the various input devices connected thereto, including the joystick 38 and the steering wheel 39. In the depicted embodiment, which is also represented in FIG. 4, each throttle/shift lever 31 and 32 is connected to a corresponding HCM 12a and 12d. Signals relating to the position of the throttle/shift levers 31, 32 are thus provided as direct inputs to the respective HCM 12a, 12d. That HCM, 12a, 12d then communicates throttle and shift demand values via one or more of the available CAN buses 20, 22, 24 in accordance with the throttle/shift lever positions sensed by the lever position sensors 33, 34.

The control system 10 further includes a propulsion CAN bus 20 (CAN P) connecting all controllers, including all HCMs 12a-12d, all ECMs 14a-14d, and all TVMs 16a-16d for the propulsion devices 3a-3d. In this embodiment, the steering wheel 39 also communicates on the propulsion CAN bus 20. Thus, messages communicated on the propulsion CAN bus are available to any of the controllers 12, 14, 16. The control system 10 further includes a dedicated CAN bus 24a-24d for each propulsion device 3a-3d. Specifically, a first dedicated CAN bus (CAN X1) 24a is provided to facilitate communication of messages only between the HCM 12a, ECM 14a, and TVM 16a for the first propulsion device 3a. Thus, messages communicated on the first dedicated CAN bus 24a are only receivable by the other controllers 12a, 14a, 16a associated with the same propulsion device 3a. Likewise, a second dedicated (CAN X2) 24b is provided connecting the HCM 12b, ECM 14b, and TVM 16b associated with the second propulsion device 3b. A third dedicated CAN bus (CAN X3) 24c connects the HCM 12c, ECM 14c, and TVM 16c, for the third propulsion device 3c. A fourth dedicated CAN bus (CAN X4) 24d connects the HCM 12d, ECM 14d, and TVM 16d for the fourth propulsion device 3d.

Each controller 12, 14, 16 includes a processing system and a storage system, wherein processing system loads and executes software providing control instructions from the storage system. In the depicted embodiment, the HCMs 12 contain computer-executable instructions to perform the automatic CAN addressing methods described herein. In other embodiments, a different controller associated with each respective propulsion device 3 in the propulsion system 1 (e.g. the ECMs 14 or the TVMs 16) may instead be provided with the software to control the automatic CAN addressing process. Each processing system includes a processor, such as a microprocessor or processor core of a microcontroller, and each storage system includes one or more storage media comprising one or more memory types capable of storing the CAN address and the software instructions and readable by the processing system. For example, the storage media may include random access memory, read-only memory, flash memory, etc. For example, the controllers 12, 14, 16 may contain EEPROM and/or FRAM and configured to write the CAN address values thereto. Once new CAN addresses are stored, the respective controller will need to be power cycled (turned fully off and back on) in order for the correct CAN address to be written to memory and to take effect.

A configuration computer 40 is provided, which is generally a computing device (such as having a central processing unit) equipped with configuration control software 41 for facilitating configuration of the control system 10. The configuration control software 41 may be, for example, Mercury Computer Diagnostic System (CDS) G3 software by Mercury Marine Corporation of Fond du Lac, Wisconsin providing configuration and diagnostic support for marine joystick piloting systems. The configuration computer 40 includes a user interface 42 configured to receive input from a user, and may include a mouse, a keyboard, a voice input device, a touch input device for receiving a gesture from a user, a motion input device for detecting non-touch gestures and other motions by a user, and other comparable input devices and associated processing elements capable of receiving input from a user. Output devices such as a video display or graphical display can display an interface further associated with embodiments of the system and method.

A user, such as a field technician, utilizes the configuration computer 40 to execute the configuration control software 41 in order to facilitate configuration of the control system 10, including setting CAN addresses for the various controllers 12, 14, 16 comprising part of the control system 10. The configuration computer 40 is configured to communicate on the propulsion CAN bus 20 and the helm CAN bus 22, but is not capable of communicating CAN messages on any of the dedicated CAN buses 24a-24d. These dedicated CAN buses 24a-24d, can thus be utilized through the configuration process to send targeted change address CAN messages since these messages will only reach the controllers 12, 14, 16 associated with one propulsion device 3 and thus will not be received by two modules of the same type.

The inventors have developed the disclosed system and method which allows the provision and maintenance of identical HCM components, ECM components, and TVM components for all propulsion devices on a multi-engine system. In other words, each controller of a particular type is sold having identical hardware and software (i.e., all HCMs are identical, all ECMs are identical, all TVMs are identical), and enables automatic addressing of all the controllers in the system as an initial step in the configuration process. The inventors developed the disclosed system and method upon the recognition that existing control system configurations require time-consuming, confusing, and error-prone configuration procedures in order to rig a multi-propulsion-system vessel. The existing procedure requires a technician or installer, who is guided by existing configuration control software, to first specify an arrangement of the control system 10 (e.g., number of propulsion devices and associated controllers) and then to move levers in a particular fashion to set each HCM 12, ECM 14, and TVM 16 position uniquely in order to associate each controllers with a propulsion device in the specified arrangement. For example, existing procedures require the installer to move a throttle lever to a particular location (e.g. maximum reverse) based on the desired configuration location. For example, in a propulsion system with four propulsion devices 3a-3d, existing configuration procedures and software require the user to move the throttle lever associated with the each propulsion device 3a-3d to a reverse wide open throttle (WOT) in order to identify and set the location of each controller, HCMs 12a-12d, ECM 14a-14d, and TVM 16a-16d. The user is instructed to perform the maneuver, and once completed the user clicks "OK" via the user interface 42 on the configuration computer 40. The selected HCM 12a-12d then sends a change address CAN message to the corresponding ECM 14a and/or TVM 16a to instruct those modules to change their CAN address based on the location of the HCM.

The user must repeat this process for each propulsion device, including performing each throttle lever maneuver, confirming each throttle lever maneuver, and sending a change address CAN message from the HCM 12 to the other controllers 12 and 14. Note that this procedure is for configurations where each propulsion device 3a-3d has a unique lever. Other propulsion control configurations are possible, such as that depicted in FIG. 1, where certain propulsion devices "shadow" the lever position of other levers. In the example at FIG. 1, the inner propulsion devices 3b and 3c shadow the corresponding outer propulsion devices 3a and 3d. Existing setup procedures for such a configuration require resistive packs installed on the lever inputs of the shadow HCMs 12b and 12c to specify their location, and thus set their correct CAN addresses.

Once completed, all of the modules must be rebooted in order for the new CAN address to be written to memory of that CAN module and utilized subsequent messaging. The shutdown procedure is arduous and typically involves instructing a user to shut down the propulsion devices and corresponding controllers in a particular order and wait a threshold amount of time before keying back up. This process is error-prone and can easily be performed incorrectly. If the configuration is incorrect, troubleshooting the error is extremely difficult since the CAN addresses are incorrect and thus the various controllers cannot be properly identified or distinguished from one another.

In view of the shortcomings of prior art methods and systems for configuring propulsion control system 10, the inventors have developed the disclosed system, method, and devices which eliminate the requirement to move levers during the configuration procedure in order to set up the controllers 12, 14, 16. Additionally, the disclosed system and method provides a "plug and play" control system 10 that automatically assigns correct CAN addresses to each controller 12 14, 16, in the control system 10. The disclosed system includes the provision of HCM with correct HCM CAN addresses identifying the propulsion device system of the corresponding propulsion device 3a-3d. For example, hardware variations between the circuit boards to which each HCM 12a-12d is connected may be provided to automatically indicate the propulsion device position to the HCM 12a-12d. An example of such an embodiment is exemplified and described with respect to FIG. 4.

Once the location of the HCM 12a-12d is set, each HCM 12a-12d can compare its location to the location of the other controllers that it is connected to via the respective dedicated CAN bus 24a-24d. Specifically, each HCM is configured to receive an initial CAN address from each of the other controllers (e.g., 14 and 16) connected to the dedicated CAN bus 24a, and to compare the initial location information provided in that initial CAN address to the propulsion device position already specified for that HCM 12a-12d. If an incorrect CAN address is identified—i.e. a mismatch in the positions specified by the respective CAN address—then the HCM sends a change address CAN message via the dedicated CAN bus 24a-24d to the other controller having the incorrect CAN address.

Figure 2:
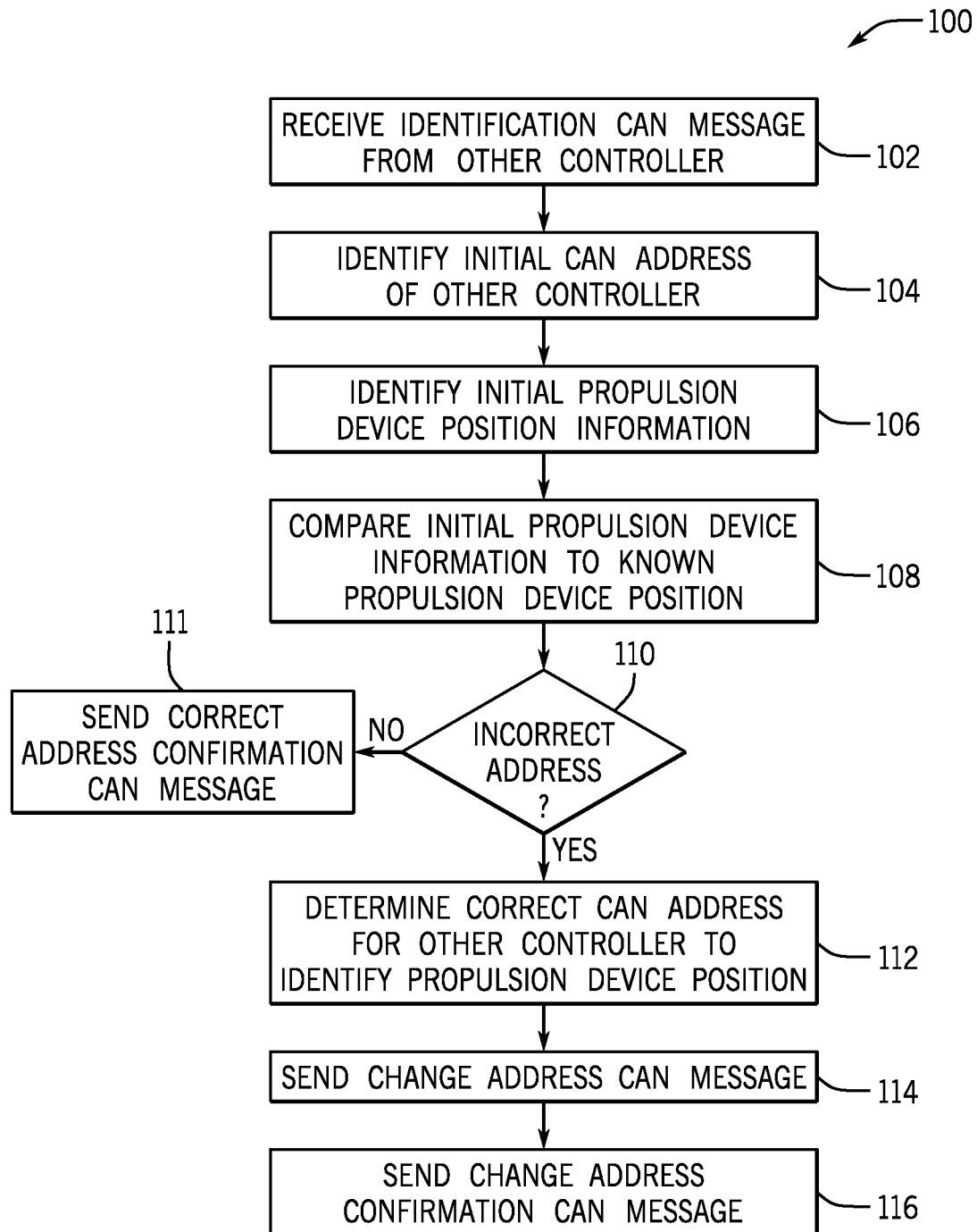
FIGS. 2 and 3A-3B depict embodiments of methods, or portions thereof, of configuring a marine propulsion system in accordance with the present disclosure.

FIG. 2 depicts one embodiment of method steps executed by one module in the control system 10 in order to change the CAN addresses of other controllers associated with the same propulsion device. In the configuration of FIG. 1, each of the helm controllers 12a-12d are configured with software—i.e., instructions executable on a processor—to assess the CAN addresses of the other controllers associated with the same propulsion devices 3a-3d to determine whether they are configured with the correct propulsion device position. In the method 100 exemplified at FIG. 2, the HCM 12 receives an identification CAN message from another controller at step 102, wherein the CAN message is transmitted via the dedicated CAN bus 24 and thus the other controller is certain to be associated with the same propulsion device 3.

Step 104 is executed to assess the initial CAN address received from the other controller and initial propulsion device information is identified at step 106. The initial propulsion device information is compared to the known propulsion device position at step 108. For example, the propulsion device position may be specified at certain digits in the CAN address, such as according to a preset code where each propulsion device position is specified by one or more digits at a certain location in the CAN address. The comparison at step 108 would then determine whether those digits in the initial CAN address match digits at the same location in the HCM CAN address. If so, then the HCM determines at step 110 that the other controller has the correct CAN address. In certain embodiments, the HCM 12 may then send a correct address confirmation message at step 111 on one of the CAN buses that connect to the configuration computer 40 so that the user can verify that the controllers associated with that propulsion device 3a-3d are correctly addressed.

If the initial propulsion device information does not match the propulsion device position known by the HCM 12, then an incorrect address determination is made that the initial CAN address for the other controller does not properly specify the propulsion device position. The HCM 12 then determines the correct CAN address for the one or more other controllers 14, 16 associated with the same propulsion device 3, which correctly identifies the propulsion device position. For example, the HCM 12 may simply replace the digits containing the initial propulsion device information with values specifying the correct propulsion device position. The HCM 12 then sends a change address CAN message at step 114 over the dedicated CAN bus 24, where the change address CAN message instructs replacement of the initial CAN address with the correct CAN address determined at step 112. In certain embodiments, the HCM 12 may then send a change address confirmation CAN message at step 116 on a CAN bus to which the configuration computer 40 is attached (e.g. the propulsion CAN bus 20 or the helm CAN bus 22). The change address confirmation CAN message is then utilized by the configuration control software 41 to provide notification to the user (e.g. via the user interface 42) that the change address instruction has been sent and/or the change address process is complete.

Figure 3A:
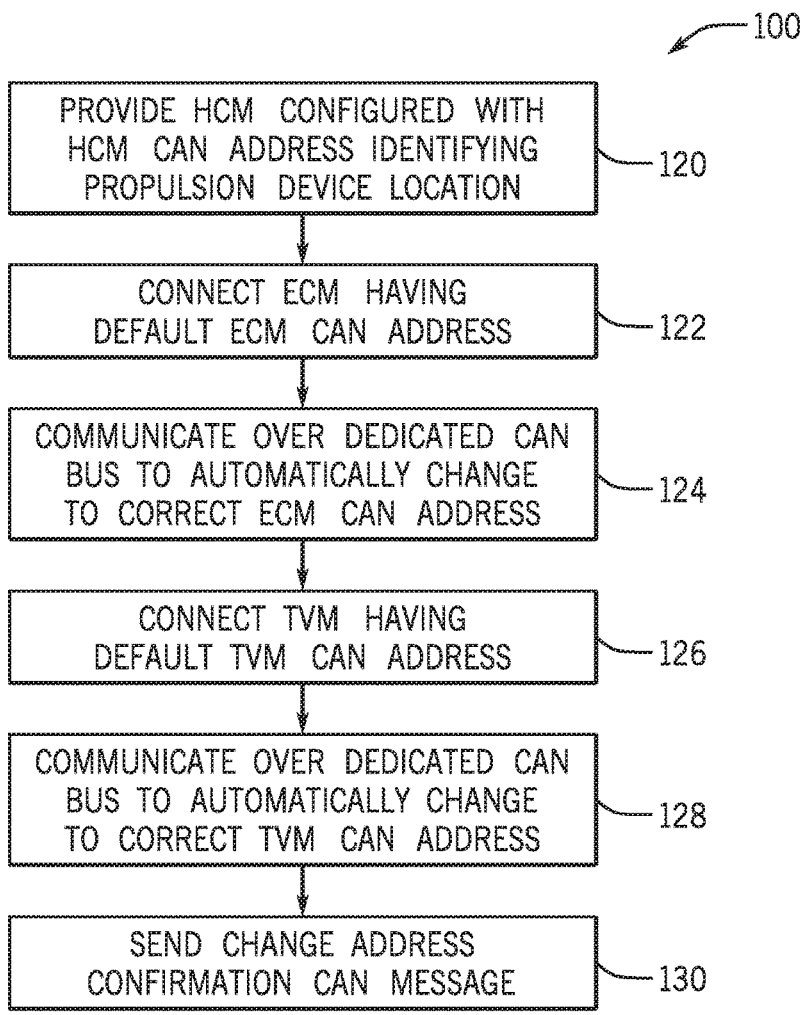
Figure 3B:
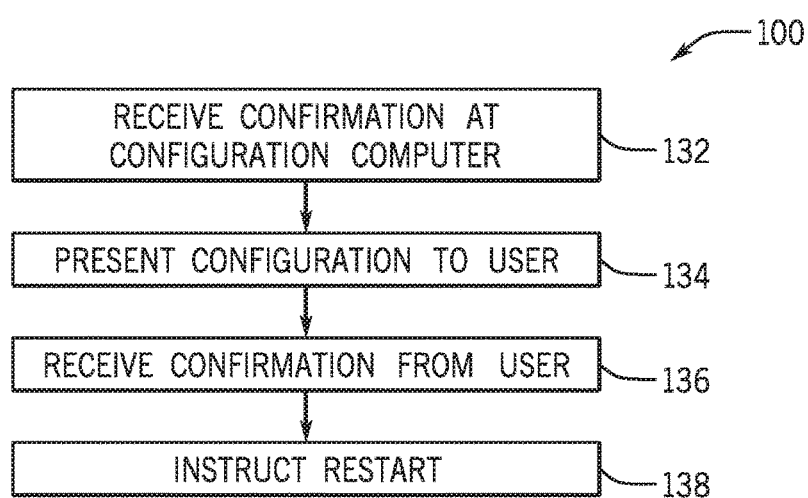

FIGS. 3A and 3B depict additional aspects of a method 100 of configuring a propulsion system. At step 120, an HCM 12 is provided that is configured with an HCM CAN address correctly identifying the propulsion device location of the associated propulsion device 3. In the depicted example, a new ECM 14 having a default ECM CAN address is connected at step 122 and a new TVM 16 having a default TVM CAN address is connected at step 126. Connection of the new controllers 14, 16 into the control system 10 can be done in any order and may be done simultaneously or in series. Alternatively, only one new controller 14 or 16 may be connected, such as to replace a failed controller of the corresponding type.

Instructions are executed by the respective controllers at step 124 and 128 to automatically change the default CAN addresses to correct CAN addresses. Specifically, instructions are executed at step 124 to communicate over the dedicated CAN bus 24 for the respective propulsion device to automatically change the initial ECM CAN address (i.e. the default value) to the correct ECM CAN address. For example, the steps illustrated in FIG. 2 may be executed by the HCM 12. Likewise, if a new TVM 16 is connected, instructions are executed by the respective TVM 16 and HCM 12 to communicate over the dedicated CAN bus 24 to change the initial CAN address to the correct TVM CAN address, as represented at step 128. A change address confirmation CAN message is then sent at step 130 to the configuration computer 40 specifying what change address CAN message was sent. As described above, the change address confirmation CAN message is sent by a CAN bus to which the configuration computer 40 is connected, such as the propulsion CAN bus 20 or the helm CAN bus 22.

The configuration computer 40, under control of the configuration control software 41, may then execute steps to verify the control system 10 configuration with the user and to finalize the configuration by instructing power down and restart of each controller 12, 14, 16 in the control system 10. Exemplary method 100 steps are illustrated in FIG. 3b. The change address confirmation CAN message is received at the configuration computer 40 at step 132. The configuration computer 40 presents the configuration to the user at step 134, such as via the user interface 42. The user is prompted to provide input to confirm the control system 10 configuration, and such confirmation input is received from the user at step 136. The configuration computer 40 then instructs restart of the control system 10 at step 138. For example, the configuration computer 40 may present an instruction via the user interface 42 to the user to key cycle the propulsion system 1. Alternatively, the configuration computer 40 may send a CAN message to one or more of the controllers to restart themselves. For example, the configuration computer 40 may send a CAN message directed to each controller class (e.g. ECM 14 or TVM 16) for all such modules to save and reboot so that the correct CAN addresses can be written to memory.

As will be understood by a person having ordinary skill in the art in light of this disclosure, other situations aside from initial configuration to change the default CAN address may require execution of the foregoing steps, such as system reconfiguration where propulsion devices and/or controllers are added, removed, or replaced in the propulsion system 1, and thus controllers need to be readdressed accordingly. Thus, the initial CAN address may not always be a default address, but may be any unverified CAN address.

The steps to automatically assign CAN addresses to controllers in the control system 10 require an initial position configuration of at least one controller in the system, which is the controller configured to then assign correct CAN address to the remaining controllers for the corresponding propulsion device 3a-3d. In the various embodiments described herein, the HCM 12 is configured for such tasks; however, in other embodiments, a different one of the controllers (e.g. ECM 14 or TVM 16) may be configured to perform the address comparison and assignment task.

Initialization of the address-assignment module, such as the HCM 12, can be performed by various means. For example, pre-configured HCM can be provided from the control system manufacturer, such as unique HCMs 12a-12d configured for their assigned propulsion device position and the number of propulsion devices in the corresponding system, i.e., each HCM 12-12d provided and maintained as a distinct part and having a unique SKU. Thus, a port outer HCM 12a would have a CAN address specifying its port outer position, as well as whether it is one of two, one of three, one of four, etc.

Alternatively, generic HCM 12 devices can be supplied, and the HCM can be configured as part of the configuration process for the control system 10. The inventors have beneficially developed a system wherein the HCMs 12 can automatically determine their location upon being connected to the electronic remote control (ERC) 30. Specifically, the ERC 30 may be equipped with a unique circuit board 36a-36d for each propulsion device 3a-3d. Each circuit board 36a-36d is configured to receive an HCM 12a-12d and to provide a specified voltage to a designated analog pin 13a-13d thereof, wherein the voltage amount indicates the propulsion device position. Specifically, a jumper on the circuit board connects to each analog pin 13a-13d to provide a particular voltage amount, wherein each circuit board 36a-36d provides a different voltage amount than the other such that the different voltage amounts can be reliably distinguished by the HCM 12a-12d. The HCM 12a-12d connected to each circuit board 36a-36d is configured to automatically set its HCM CAN address to specify propulsion device position based on the jumper voltage. For example, each circuit board 36a-36d may be equipped with a voltage regulator 37a-37d connected to a voltage source 45 and configured to provide a specified terminal voltage—i.e., the jumper voltage.

Each HCM 12a-12d is configured to associate the various jumper voltages with a propulsion device position, and thus a CAN address. To provide just one example, each HCM may be configured to set its own CAN address to one of a preset list of HCM CAN addresses based on the voltage at the analog pin 13a-13d. For example, each voltage level on a specified list of possible jumper voltages may be associated with a specific HCM CAN address, wherein the list includes a sufficient number of voltage levels and CAN addresses to specify all propulsion device arrangements (e.g. the number of propulsion devices and corresponding positions).

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A controller associated with a propulsion device in a marine propulsion system, the controller having computer-executable instructions stored thereon executed by a processor to perform a method of automatically configuring at least one other controller associated with the propulsion device in a marine propulsion system, the method comprising:
    storing a controller CAN address that identifies a propulsion device position of the propulsion device in the marine propulsion system;
    receiving an identification CAN message communicating an initial CAN address from the other controller via a dedicated controller area network (CAN) bus, wherein the initial CAN address is a CAN address stored in memory of the other controller containing initial propulsion device position information;
    comparing the initial CAN address to the controller CAN address to determine whether the initial propulsion device position information correctly identifies the propulsion device position;
    identifying an incorrect address based on the comparison, where the initial CAN address does not correctly identify the propulsion device position; and
    upon identifying the incorrect address, sending a change address CAN message via the dedicated CAN bus from the controller to change the initial CAN address stored in memory of the other controller to a correct CAN address that identifies the propulsion device position.

2. The controller having computer-executable instructions stored thereon executed by a processor to perform the method of claim 1, wherein the controller is a helm controller (HCM) and the at least one other controller includes an engine controller (ECM) communicatively connected to the propulsion device to control an engine thereof, the ECM having an initial ECM CAN address.

3. The controller having computer-executable instructions stored thereon executed by a processor to perform the method of claim 2, wherein the initial ECM CAN address is a default CAN address containing default propulsion device position information, the method further comprising:
    communicating with the ECM so as to automatically change the initial CAN address of the ECM containing the default propulsion device position information to the correct CAN address for the ECM identifying the propulsion device position.

4. The controller having computer-executable instructions stored thereon executed by a processor to perform the method of claim 1, wherein the controller is a helm controller (HCM) and the at least one other controller includes a thrust vector controller (TVM) to control steering of the propulsion device.

5. The controller having computer-executable instructions stored thereon executed by a processor to perform the method of claim 1, wherein the controller is a helm controller (HCM) and the method further comprising:
    communicating a change address confirmation, the controller CAN address, and the correct CAN address for the other controller to a configuration computer via a helm CAN bus.

6. The controller having computer-executable instructions stored thereon executed by a processor to perform the method of claim 1, the method further comprising:
   detecting a jumper voltage on an analog pin of the controller;
   automatically assigning the controller CAN address to identify the propulsion device position based on the jumper voltage.

7. A marine propulsion system comprising:
   at least a first propulsion device at a first propulsion device position on a marine vessel;
   a first engine controller (ECM) communicatively connected to the first propulsion device to effectuate control thereof, the first ECM having an initial ECM CAN address stored in memory;
   a first helm controller (HCM) having a first HCM CAN address stored in memory, wherein the first HCM CAN address identifies the first propulsion device position;
   a first dedicated controller area network (CAN) bus communicatively connecting the first ECM and the first HCM so as to communicate CAN messages therebetween;
   wherein the first HCM is configured to:
      receive an identification CAN message communicating an initial ECM CAN address from the first ECM via the first dedicated CAN bus;
      compare the initial ECM CAN address to the first HCM CAN address to determine whether the initial ECM CAN address correctly identifies the first propulsion device position;
      identify an incorrect ECM CAN address based on the comparison, where the initial ECM CAN address does not correctly identify the first propulsion device position; and
      send a change address CAN message via the first dedicated CAN bus from the first HCM to change the initial ECM CAN address stored in memory of the first ECM to a correct first ECM CAN address that identifies the first propulsion device position.

8. The system of claim 7, wherein the initial ECM CAN address is a default CAN address containing default propulsion device position information.

9. The system of claim 8, wherein the first HCM is configured to communicate with the first ECM upon connection of the first ECM within the propulsion system so as to automatically change the initial ECM CAN address containing the default propulsion device position information to the correct first ECM CAN address identifying the first propulsion device position.

10. The system of claim 7, further comprising:
    a first circuit board connected to the first HCM, the first circuit board having a first jumper that connects to an analog pin of the first HCM and provides a first jumper voltage;
    wherein the first HCM is further configured to automatically assign the first HCM CAN address to identify the first propulsion device position based on the first jumper voltage.

11. The system of claim 7, further comprising a first thrust vector controller (TVM) configured to control steering of the first propulsion device;
    wherein the first dedicated CAN bus further connects to the first TVM to communicate CAN messages between the first TVM, the first HCM, and the first ECM;
    wherein the first HCM is further configured to communicate with the first TVM upon connection of the first TVM within the propulsion control system so as to automatically establish a correct first TVM CAN address identifying the first propulsion device position.

12. The system of claim 11, wherein the first HCM is further configured to:
    receive an identification CAN message communicating an initial TVM CAN address from the first TVM via the first dedicated CAN bus;
    compare the initial TVM CAN address to the first HCM CAN address to determine whether the initial TVM CAN address correctly identifies the first propulsion device position; and
    identify an incorrect TVM address based on the comparison, where the initial TVM CAN address does not correctly identify the first propulsion device position; and
    upon identifying the incorrect TVM address, send a change address CAN message via the first dedicated CAN bus from the first HCM to the first TVM to change the initial TVM CAN address of the first TVM to the correct first TVM CAN address that identifies the first propulsion device position.

13. The system of claim 7, further comprising:
    a second propulsion device at a second propulsion device position on the marine vessel;
    a second ECM communicatively connected to the second propulsion device to effectuate control thereof, the first HCM having the initial ECM CAN address stored in memory;
    a second HCM having a second HCM CAN address stored in memory, wherein the second HCM CAN address identifies the second propulsion device position;
    a second dedicated controller area network (CAN) bus communicatively connecting the second ECM and the second HCM so as to communicate CAN messages therebetween;
    wherein the second HCM is configured to:
       receive an identification CAN message communicating the initial ECM CAN address from the second ECM via the second dedicated CAN bus;
       compare the initial ECM CAN address to the second HCM CAN address to determine whether the initial ECM CAN address correctly identifies the second propulsion device position; and
       identify an incorrect ECM CAN address based on the comparison, where the initial ECM CAN address does not correctly identify the second propulsion device position; and
       send a change address CAN message via the second dedicated CAN bus from the second HCM to the second ECM to change the initial ECM CAN address stored in memory of the second ECM to a correct second ECM CAN address that identifies the second propulsion device position.

14. The system of claim 13, further comprising:
    a first circuit board connected to the first HCM, the first circuit board having a first jumper that connects to an analog pin of the first HCM and provides a first jumper voltage;
    wherein the first HCM is further configured to automatically assign the first HCM CAN address to identify the first propulsion device position based on the first jumper voltage;
    a second circuit board connected to the second HCM, the second circuit board having a second jumper that connects to an analog pin of the second HCM and provides a second jumper voltage;

wherein the first HCM is further configured to automatically assign the second HCM CAN address to identify the second propulsion device position based on the second jumper voltage.

15. The system of claim 13, further comprising:
a helm CAN bus connecting the first HCM and the second HCM;
a propulsion CAN bus connecting the first HCM, the second HCM, the first ECM, and the second ECM; and
a configuration computer operating configuration control software, wherein the configuration computer communicates on the helm CAN bus and the propulsion CAN bus and is configured to:
  determine an arrangement of the marine propulsion system based on information received via the helm CAN bus and/or the propulsion CAN bus, including the first HCM CAN address, the second HCM CAN address, the correct first ECM CAN address, and the correct second ECM CAN address;
  visually present the arrangement to a user; and
  request confirmation from the user regarding the arrangement.

16. A method of configuring a marine propulsion system, the method comprising:
providing at least a first propulsion device at a first propulsion device position on a marine vessel;
providing a first engine controller (ECM) communicatively connected to the first propulsion device to effectuate control thereof, the first ECM having an initial ECM CAN address stored in memory;
providing a first helm controller (HCM) having a first HCM CAN address stored in memory, wherein the first HCM CAN address identifies the first propulsion device position; providing a first dedicated controller area network (CAN) bus communicatively connecting the first ECM and the first HCM so as to communicate CAN messages therebetween;
at the first HCM:
  receiving an identification CAN message communicating an initial ECM CAN address from the first ECM via the first dedicated CAN bus;
  comparing the initial ECM CAN address to the first HCM CAN address to determine whether the initial ECM CAN address correctly identifies the first propulsion device position;
  identifying an incorrect ECM CAN address based on the comparison, where the initial ECM CAN address does not correctly identify the first propulsion device position; and
  upon identifying the incorrect ECM CAN address, sending a change address CAN message via the first dedicated CAN bus from the first HCM to change the initial ECM CAN address stored in memory of the first ECM to a correct first ECM CAN address that identifies the first propulsion device position.

17. The method of claim 16, wherein the initial ECM CAN address is a default CAN address containing default propulsion device position information.

18. The method of claim 17, wherein the first HCM is configured to communicate with the first ECM upon connection of the first ECM within the propulsion control system so as to automatically change the initial ECM CAN address containing the default propulsion device position information to the correct first ECM CAN address identifying the first propulsion device position.

19. The method of claim 16, further comprising at the first HCM:
detecting a jumper voltage on an analog pin of the first HCM; and
automatically assigning the HCM CAN address to identify the first propulsion device position based on the jumper voltage.

20. The method of claim 16, further comprising:
providing a first thrust vector controller (TVM) configured to control steering of the first propulsion device;
wherein the first dedicated CAN bus further connects to the first TVM to communicate CAN messages between the first TVM, the first HCM, and the first ECM;
receiving an identification CAN message at the first HCM communicating an initial TVM CAN address from the first TVM via the first dedicated CAN bus;
comparing, at the first HCM, the initial TVM CAN address to the first HCM CAN address to determine whether the initial TVM CAN address correctly identifies the first propulsion device position; and
identifying, at the first HCM, an incorrect TVM address based on the comparison, where the initial TVM CAN address does not correctly identify the first propulsion device position; and
upon identifying the incorrect TVM address, sending a change address CAN message via the first dedicated CAN bus from the first HCM to change the initial TVM CAN address stored in memory of the first TVM to a correct first TVM CAN address that identifies the first propulsion device position.

* * * * *